CAVANAUGH & LAZEAR.
Hot Air Cooking Stove.
No. 29,244.
Patented July 24, 1860.
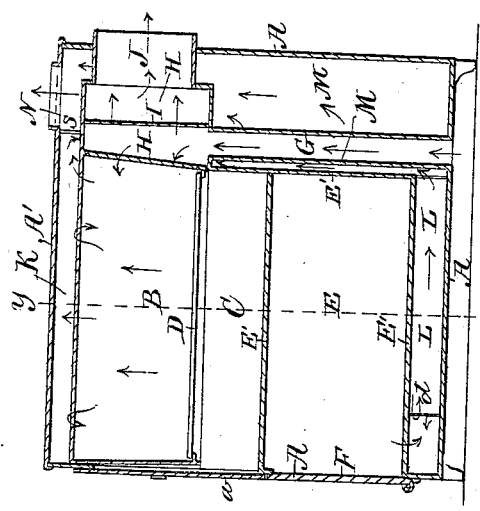
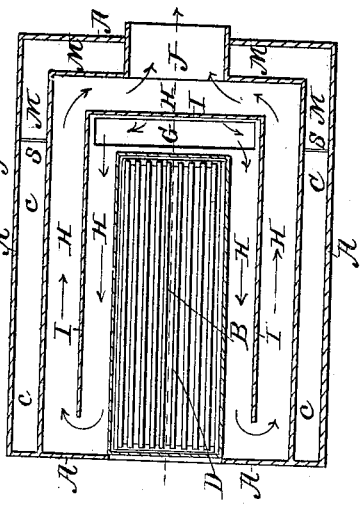

UNITED STATES PATENT OFFICE.

R. K. CAVANAUGH AND H. Y. LAZEAR, OF JERSEY CITY, NEW JERSEY.

COOKING-STOVE.

Specification of Letters Patent No. 29,244, dated July 24, 1860.

*To all whom it may concern:*

Be it known that we, R. K. CAVANAUGH and H. Y. LAZEAR, both of Jersey City, in the county of Hudson and State of New Jersey, have invented a new and useful Hot-Air, Gas-Consuming and Cooking Stove; and we do hereby declare that the following is a full, clear, and exact description thereof, reference being had to the accompanying drawings, forming a part of this specification, in which—

Figure 1 represents a vertical longitudinal section taken through my stove from front to rear of the same. Fig. 2 is a horizontal section taken through the hot air flues and fire-box, as indicated by the red lines *x*, *x*, of Fig. 3. Fig. 3 is a vertical transverse section, taken through the stove, as indicated by the red line *y*, *y*, of Fig. 1. Fig. 4 is a horizontal section taken through the stove, as indicated by the red line *v*, *v*, of Fig. 3. In this figure the top plate is supposed to be on, but indicated by red lines.

Similar letters of reference indicate corresponding parts in the several figures.

This invention has for its object an improvement in cooking stoves, whereby we obtain a more uniform exposure of direct heat from the fire-box to the boiler holes in the top of the stove, so that each boiler may receive an equal share of heat by being disposed immediately over the fire; and whereby we are enabled to expose the oven of the stove to a greater heating surface and so that the heat will be diffused throughout the same to a better advantage for cooking purposes. It also provides for heating air and conducting the same, while in its heated state, to any desirable place for heating the same, as in hot air furnaces; and lastly for supplying the fire with air, while in a heated state, in sufficient quantities to effect a thorough combustion of the carbon, thus we obtain a hot air, gas burning and cooking stove, to be hereinafter described.

To enable those skilled in the art to fully understand my invention I will proceed to describe its construction and operation.

In the drawings, A represents a quadrangular box, near the top of which is arranged the fire-box, B, and below this fire place is the ash pan, C, which latter is reached through a front door, *a*.

D are the grate bars to the fire place.

E represents the oven of the stove and E', the walls surrounding the same.

F is the oven door.

G is a vertical pipe arranged immediately in rear of the oven which communicates with the air in the room at one end, and at the other with a hot air flue box, H, which extends along the sides and across the rear of the fire-box, B.

I is a partition placed within the box, H, so as to divide this box into flues, through which the air which enters through pipe, G, is made to circulate; the direction of the current is indicated by red arrows.

J is a pipe leading from the box, H, to which flues may be conected for conducting the air from said box wherever desired, for warming purposes.

In the top plate forming the box, H, and near its inner edge, or that nearest the fireplace, are perforations, *b*, *b*, from which small quantities of highly heated air jet, and mingle with the products of combustion, supplying the fire with large quantities of oxygen, and increasing the intensity of heat to such an extent as to consume a large portion of the smoke, etc., rising from the fireplace. This combustion and consumption takes place immediately under the top plate, A', of the stove in the smoke flue space, K. The smoke, etc., which is not consumed passes through the flue space, K, over the top of the flue box, H, and proceeds down each side of the stove through spaces, lettered *c c*, to the bottom of the stove. The heated smoke then passes under the oven toward the front of the same, it is then drawn through the flue, L, formed by oblique plates, *d d*, Figs. 1 and 3, and enters the chamber, M, in the rear of the oven, E, (Figs. 1, 2 and 4) from whence it is drawn up through the smoke pipe hole, N, as indicated by the black arrows. Chamber, M, is separated from *c*, by vertical partitions, S.

The black arrows in the drawings indicate the direction of the smoke through the stove, while the red arrows show the direction of the cold and heated air.

Now in order to give a clear idea of the operation of our stove we will,—with reference to the drawings,—follow the direction of the two currents, and their passage through the stove. The fuel is supplied to the fire-box, B, through the boiler holes,—shown in Fig. 4, in red lines, and a draft will be immediately created in the box, H, which will induce a current of cold air to rush in at the bottom of the vertical flue, G, as indicated by red arrows. This air will, in consequence of the close contact of the heated surfaces of the plate forming the flues, become rapidly heated. When it arrives at the top of the flue, G, it is drawn toward the front of the stove between the highly heated plates of the fire-box and partition, I, to the front of the stove, the currents return again to the rear of the stove, and in a highly heated state pass through the pipe, J, from whence the hot air may be conducted away and utilized for warming apartments about the building. The smoke and other products of combustion rising from the fire-box mingle with small quantities of highly heated air, supplied from box, H, as hereinbefore described, and this has the effect of increasing combustion, and consuming large quantities of the smoke, etc., directly under the boiler holes in the top plate of the stove. After combustion has thus taken place, the highly heated smoke, etc., passes over the top of the flue boxes, and down either side of the stove as shown by the arrows in Fig. 3. This downward current circulates along the sides of the oven, (first, over that portion of its top which is not covered by the ash pan, C,), and when it reaches the bottom of the stove it is directed toward the front of the oven—under the same—and thence back through a horizontal flue, L, which gradually increases in width to the rear end of the oven. This current which is not entirely divested of its heat comes in direct contact with the lower portion of the vertical cold air flue, G, and keeps the same in a heated state, the smoke then ascends the flue space, M, circulates around flue, G, and the rear, or transverse portion of the hot air box, H, and finally escapes up the stove-pipe through the pipe hole, N.

We arrange over the chamber, M, on each side of the top plate, A′, registers, R R, which serve to register the draft; it may also be found necessary to introduce in plate, S, a damper (not shown) for the purpose of obtaining a direct draft for starting the fire, but those appendages are all incidental to the general arrangement of our stove, and may be applied or dispensed with as the occasion demands for perfecting the operation of our hot air, gas consuming cook stove.

We are aware that stoves have been devised for drawing in cold air, heating it, and diffusing the same throughout buildings, for warming apartments; so also have stoves been arranged for consuming the smoke, etc., therefore we wish it distinctly understood that we do not claim the same irrespective of our particular arrangement.

What we claim as our invention and desire to secure by Letters Patent is—

1. The combination and arrangement, with a stove constructed as herein described, of the fire box B, perforated flue box H, b, b, and vertical cold air pipe G, in the manner and for the purpose set forth.

2. We claim the smoke flue K, descending flues c, c, flue L, and ascending flue M, combined and arranged with relation to the several parts of the stove, all as and for the purpose herein set forth.

R. K. CAVANAUGH.
H. Y. LAZEAR.

Witnesses:
B. GIROUT,
M. M. LIVINGSTON.